United States Patent [19]
Pant et al.

[11] Patent Number: 6,012,053
[45] Date of Patent: *Jan. 4, 2000

[54] COMPUTER SYSTEM WITH USER-CONTROLLED RELEVANCE RANKING OF SEARCH RESULTS

[75] Inventors: Sangam Pant, Winchester; David L. Andre, Belmont, both of Mass.; Gray Watson; Richard M. Green, both of Pittsburgh, Pa.; Michael J. Schiegg, McKeesport, Pa.

[73] Assignee: Lycos, Inc., Waltham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/880,923

[22] Filed: Jun. 23, 1997

[51] Int. Cl.[7] .................................. G06F 17/30
[52] U.S. Cl. .................. 707/3; 707/4; 707/5; 707/6; 364/133; 364/222; 345/333; 345/968
[58] Field of Search .................. 707/3, 4, 5, 6, 707/7, 102, 103, 104, 203; 364/920, 6, 222, 133; 340/146; 395/185; 455/4, 2; 348/2, 7, 10, 12; 345/333, 968, 978, 335; 382/167

[56] References Cited

U.S. PATENT DOCUMENTS

| | | | |
|---|---|---|---|
| 5,321,833 | 6/1994 | Cheng et al | 395/600 |
| 5,500,920 | 3/1996 | Kupiec | 707/4 |
| 5,544,049 | 8/1996 | Henderson et al. | 707/4 |
| 5,577,241 | 11/1996 | Spencer | 707/5 |
| 5,644,686 | 7/1997 | Hekmatpour | 706/45 |
| 5,675,819 | 10/1997 | Schuetze | 707/3 |
| 5,696,962 | 12/1997 | Kupiec | 707/3 |
| 5,754,938 | 5/1998 | Herz et al. | 707/3 |
| 5,819,004 | 10/1998 | Azadegan et al. | 386/112 |
| 5,832,496 | 11/1998 | Anand et al. | 707/102 |
| 5,890,152 | 3/1999 | Rapaport et al. | 707/6 |
| 5,899,999 | 5/1999 | De Bonet | 707/104 |

*Primary Examiner*—Paul R. Lintz
*Assistant Examiner*—Thu-Thao Havan
*Attorney, Agent, or Firm*—Wolf, Greenfield & Sacks, P.C.

[57] ABSTRACT

A computer system for performing searches on a collection of information includes a mechanism through which results from a search query are ranked according to user specified relevance factors to allow the user to control how the search results are presented. The relevance factors are applied to the results achieved for each query. That is, each item returned by the search has a set of attributes. Each of these attributes is assigned a weight according to the specified relevance factors. These weights are combined to provide a score for the item. Search results are provided to the user, ordered according to scores. The application of the relevance factors does not alter the query performed on the collection of information.

12 Claims, 9 Drawing Sheets

1-10 of 43 relevant results
Just the links Standard Descriptions Detailed Descriptions

1) Bill Clinton -- Issue Information —330
Candidate for President of the United States Bill Clinton Party: Democrat —332
Please Note This cand...
http://vote-smart.org/cam [100%] —336
　　　　　　　　　　　—334

2) Bill Clinton -- Issue Information
Candidate for President of the United States Bill Clinton: Democrat
Please Note This cand...
http://www.vote-smart.org [100%]

3) All About Bill Clinton - President of the United States
Get paid - Free Web Site Join 42,000 People Worldwide! Search Icemall's
Bookstore: Fortunes! Go...
htp://www.icemall.com/al [82%]

4) Public Opinion on U.S. Foreign Policy and Defense -- Issue '96 -
Issues '96: The Candidate's Briefing Book The Heritage Foundation Chapter 20
PUBLIC OPINION...
http://www.heritage.org/h [82%]

5) Twentieth Century Fund/The Century Foundation on AMERICAN FOREIGN POLICY
The Twentieth Century Fund/The Century Foundation on: Foreign Policy The
demise of the former S...
http://www.epn.org/tcf/xx [82%]

6) Twentieth Century Fund/The Century Foundation on AMERICAN FOREIGN POLICY
The Twentieth Century Fund/The Century Foundation on: Foreign Policy The
demise of the former S...
http://epn.org//tcf/xxfor [82%]

7) Twentieth Century Fund/The Century Foundation on AMERICAN FOREIGN POLICY
The Twentieth Century Fund/The Century Foundation on: Foreign Policy The
demise of the former S...
http://epn.org/tcf/xxfor- [82%]

8) 11-29-95
Clinton flexes new muscle on U.S. foreign policy (c) Copyright Nando.net
Reuters LONDON - Ever...
http://www.nando.net/news [80%]

9) Columns
ARCHIVED COLUMNS WHY I AM VOTING FOR BOB DOLE By: Joe Farrell
Because he is not Bill Clinton? I...
http://gs1.com/messenger/ [62%]

10) Columns
ARCHIVED COLUMNS WHY I AM NOT VOTING FOR BOB DOLE By: Joe Farrell
Because he is not Bill Clinton? I...
http://gs1.com/messenger/ [62%]

Previous Page　Next page　Refine Your Search

Fig. 7

1-10 of 43 relevant results
Just the links  Standard Descriptions  Detailed Descriptions

1) CBS NEWS
--->BILL CLINTON'S FAVORABILITY RATING Date: 10-30-1996 The question, "Is your opinion of...
http://www.cbsnews.com/cb [100%]

2) Ukraine FAQ + The Ukrainian Weekly 9510.08 - Bohdan Peter Rekshynskyj
October 25th, 1995 (Vol. LXIII, No. 42) Clinton cautions against isolationism, Meets with ethni...
http://www.tryzub.com/UFP [100%]

3) Lee linkshigh-level talks to mainland tilt for power lien and Cabinet tender re
Contents (Politics) Lee links high-level talks to mainland tilt for power lien and cabinet tend...
http://gio.gov.tw/info/fc [100%]

4) Liberal Pulse, 5-10-96
LIBERAL PULSE May 10, 1996 Unapologetic For the President by T.J. Walker You are about to hear...
http://www.idir.net/~libe [100%]

5) All About Bill Clinton ~ President Of The United States
Get paid - Free Web Site Join 42,000 People Worldwide! Search Icemall's Bookstore: Fortunes! Go...
http://www.icemall.com/al [100%]

6) FINDIANS BRIEFING V02105
TERVE - - - NAMASTE FINDIANS BRIEFINGS ARCHIVED ISSUE Volume No: 02 Issue. 05 - - - - 8th Se...
http://www.netppl.fi/~fin [100%]

7) Columns
ARCHIVED COLUMNS WHY I AM VOTING FOR BOB DOLE By: Joe Farrell Because he is not Bill Clinton? I...
http://gs1.com/messenger/ [100%]

8) Columns
ARCHIVED COLUMNS WHY I AM NOT VOTING FOR BILL CLINTON By: Joe Farrell Because he is not Bill Clinton? I...
http://gs1.com/messenger/ [100%]

9) Bill Clinton - - issue information
Candidate for president of the United States Bill Clinton Party: Democrat Please Note This cand...
http://vote-smart.org/cam [100%]

10) Politics USA, Oct. 21, 1995
Going Global Helps Clinton At Home Foreign policy developments boost president's stature as a s...
http://www.politicsusa.co [100%]

Previous Page   Next Page   Refine Your Search

Fig. 8

1-10 of 43 relevant results
Just the links Standard Descriptions Detailed Descriptions

1) Bill Clinton -- Issue Information
Candidate for President of the United States Bill Clinton Party: Democrat
Please Note This cand...
http://vote-smart.org/cam [100%]

2) Bill Clinton -- Issue Information
Candidate for President of the United States Bill Clinton: Democrat
Please Note This cand...
http://www.vote-smart.org [100%]

3) All About Bill Clinton - President of the United States
Get paid - Free Web Site Join 42,000 People Worldwide! Search Icemall's
Bookstore: Fortunes! Go...
htp://www.heritage.org/h [71%]

4) Public Opinion on U.S. Foreign Policy and Defense -- Issue '96 -
Issues '96: The Candidate's Briefing Book The Heritage Foundation Chapter 20
PUBLIC OPINION...
http://www.icemall.com/al [71%]

5) Twentieth Century Fund/The Century Foundation on AMERICAN FOREIGN POLICY
The Twentieth Century Fund/The Century Foundation on: Foreign Policy The
demise of the former S...
http://www.epn.org/tcf/xx [71%]

6) Twentieth Century Fund/The Century Foundation on AMERICAN FOREIGN POLICY
The Twentieth Century Fund/The Century Foundation on: Foreign Policy The
demise of the former S...
http://epn.org//tcf/xxfor [71%]

7) Twentieth Century Fund/The Century Foundation on AMERICAN FOREIGN POLICY
The Twentieth Century Fund/The Century Foundation on: Foreign Policy The
demise of the former S...
http://epn.org/tcf/xxfor- [71%]

8) 11-29-95
Clinton flexes new muscle on U.S. foreign policy (c) Copyright Nando.net
Reuters LONDON - Ever...
http://www.nando.net/news [67%]

9) Politics USA, Oct. 21, 1995
Going Global Helps Clinton At Home Foreign policy developments boost
president's stature as a s...
http://politicsusa.com/Po [39%]

10) Columns
ARCHIVED COLUMNS WHY I AM NOT VOTING FOR BOB DOLE By: Joe Farrell
Because he is not Bill Clinton? I...
http://gs1.com/messenger/ [39%]

Previous Page   Next page   Refine Your Search

Fig. 9

COMPUTER SYSTEM WITH USER-CONTROLLED RELEVANCE RANKING OF SEARCH RESULTS

FIELD OF THE INVENTION

The present invention is related to the searching of collections of information. In particular, the present invention is related to methods for ranking items received as the result of search of a collection of information.

BACKGROUND OF THE INVENTION

There are generally two methods used for searching for items within a collection of information, such as a database containing multiple information sources such as text documents. The first method commonly is called a Boolean search which performs logical operations over items in the collection according to rules of logic. Such searching uses conventional logic operations, such as "and", "or" or "not," and perhaps some additional operators which imply ordering or word proximity or the like or have normative force. Another method is based on a statistical analysis to determine the apparent importance of the searched terms within individual items. The search terms accrue "importance" value based on a number of factors, such as their position in an item and the context in which they appear. For example, a search term appearing in the title of a document may be given more weight than if the search term appears in a footnote of the same document. There are several forms, variations and combinations of statistical and Boolean searching methods.

One problem with searching large collections of information of many items (e.g., records, text documents, etc.) is that a particular query may provide search results which include items irrelevant to what the framer of the search has in mind or items which are too numerous for all to be reviewed. Using a large public computer network like the Internet to search a database of information available on the network, search results may be too numerous or of little value to the user and the search engine may be very frustrating to use. While the search results may be presented in an order according to some rule, such as by displaying the newest item first, by placing the items in alphabetical order, or by ranking the items according to some score assigned to the item, most search engines do not provide the capability for a user to control how search results are presented to a user or, at best, allow only minimal control in a manner that actually changes the query performed and hence affects the search results.

SUMMARY OF THE INVENTION

The present invention provides a mechanism through which results from a search query are ranked according to user-specified relevance factors to allow the user to control how the search results are presented, e.g., their order. The relevance factors are applied to the results achieved for each query. That is, each item returned by the search has a set of attributes. Each of these attributes is assigned a weight according to the specified relevance factors. These weights are combined to provide a score for the item. The scores of the items control the presentation of search results. The application of the relevance factors does not alter the query performed on the collection of information.

In one embodiment, each relevance factor is assigned a base value. These base values and an associated bonus are applied to a set of items retrieved by the search query to obtain a score for each item. By allowing the user to specify the base values, the relevance metric is tunable to the needs of the user.

One factor which may be used to affect the relevance score of an item includes the location of a search term in the item. For example, with structured documents such as those written in SGML, HTML, or other markup languages, the structural information about the document may enclose search terms and may result in a document being considered more relevant than another. The position of search terms in the body of a document, called salience, also may be used. For example, a search term appearing in the first sentence of the first paragraph of a field in a document may have greater salience than the same term found in the last sentence of a last paragraph of the same field. The frequency of occurrence of a search term in an item, or of the search term in all items, the number of search terms found in an item, the ordering of search terms in the item, the distance between terms in a item, and prefixed instance or stemming are some of the factors which may be used to compute a relevance score for a given result returned by the search engine. Other possible factors include, but certainly are not limited to, the recency of the item or the location of the item within a file system or directory of files.

Accordingly, one aspect of the present invention is a computer system for providing user-controllable relevance ranking of search results from a query on a collection of items of information. The computer system includes a relevance determination module having a first input for receiving a set of search results from a query indicating items in the collection matching the query, a second input for receiving an indication of relevance factors specified by a user, and a third input for receiving information about the items in the set of search results to which relevance factors may be applied. This module has an output for providing an indication of a score indicative of relevance for each of the items in the set of search results. A sorting module has an input which receives the score associated with each item and an indication of the set of search results, and an output providing to the user an indication of the items in the set of search results in an order ranked according to the relevance score of each item.

Other aspects of the invention include the process performed by the computer system to apply the relevance factors to the search results to provide a score for each item in the search results. Another aspect of the invention is a client computer and the process performed by the client computer to communicate with a database server to provide relevance factors and receive the ranked searched results. Another aspect of the invention is a server computer and the process performed by the server computer to receive and process a query and relevance factors from a client computer to produce relevancy ranked search results.

BRIEF DESCRIPTION OF THE DRAWING

In the drawing,

FIGS. 7–9 are illustrations of search results presented by one embodiment of the invention.

DETAILED DESCRIPTION

The present invention will be more completely understood through the following detailed description which should be read in conjunction with the attached drawing in which similar reference numbers indicate similar structures.

Figure 1:
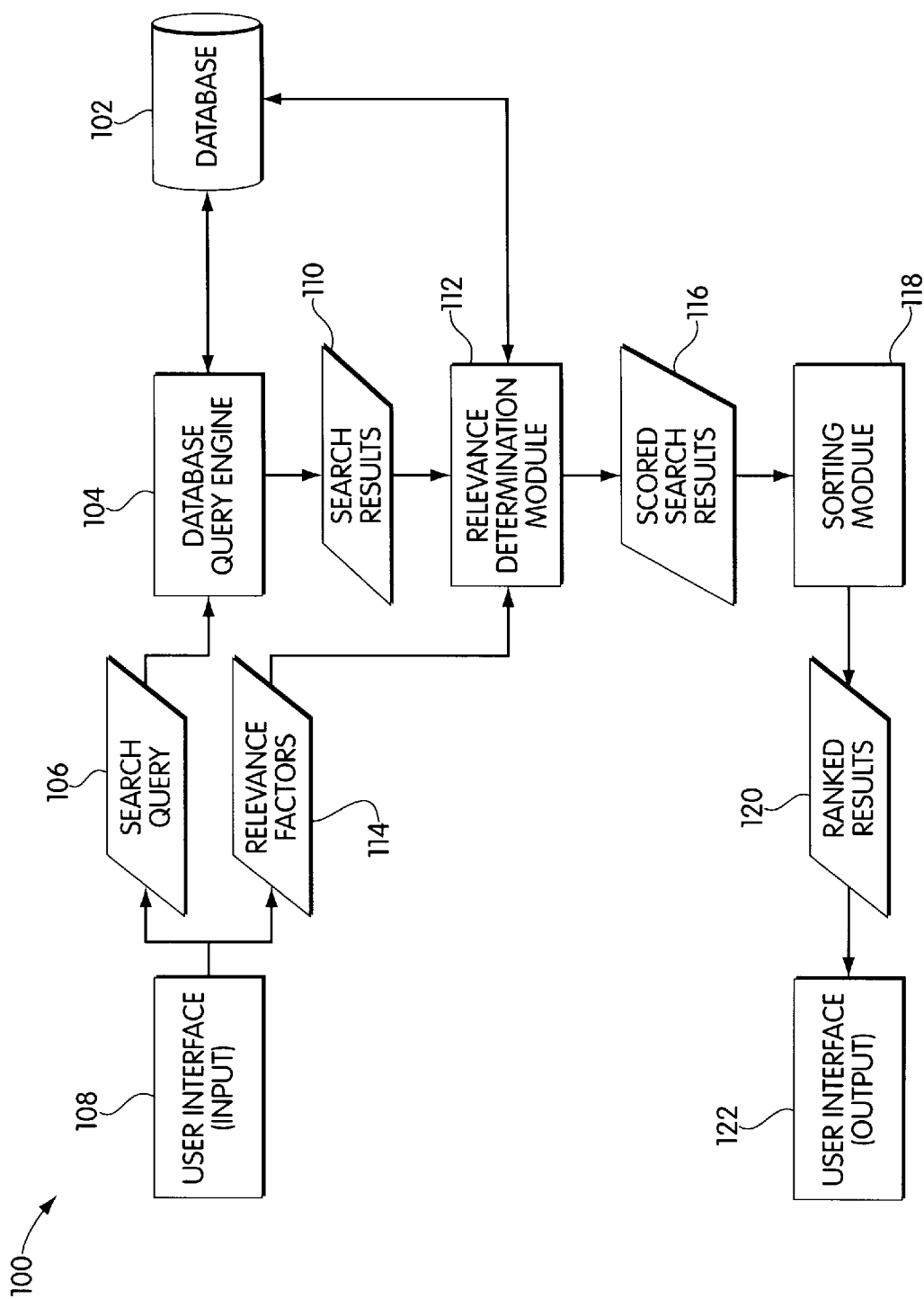
FIG. 1 is a block diagram of one embodiment of the present invention.

Referring now to FIG. 1, a computer system 100 using the present invention will now be described. The computer system 100 has access to a database 102 which is queried by a database query engine 104 in response to a search query 106. In the present invention, a database is any collection of information and contains several items. Each of the items in the collection may be compared to a search query to determine whether the item matches the search query. The collection of information may be the Internet, a similar network having a collection of documents, or a private structured database or any other searchable entity. Such a database typically includes an index representing each item in the collection of information in order to simplify the search process. In some cases, such as with a search engine for the World Wide Web, or the Internet, the index is accessed by the query engine and the actual documents to be accessed using the results of a query are from a third party source.

A user supplies the search query 106 to the query engine 104 through a user interface 108. The database query engine 104 applies the search query 106 to the database 102 to provide search results 110 which include an indication of the items in the database 102 which match the search query 106. The search results typically include enough information to access the actual item, but generally does not include the entire item in order to reduce the amount of memory needed to process the search results. In the invention, a relevance determination module 112 receives the search results 110 from the database query engine 104 and applies pre-specified relevance factors 114 to each of the corresponding items in the search results 110 to obtain scored search results 116. In particular, each of the items in the search results 110 has a set of attributes associated with it, which the module 112 may use the database 102 to access and identify if such information is not made available in the search results 110. Each of these attributes is given a weight according to the specified relevance factors 114. These weights are combined to provide a score for each item. The scored search results are sorted by sorting module 118 to provide ranked results 120 which are provided to a user interface 122 to be output to the user.

Figure 2:
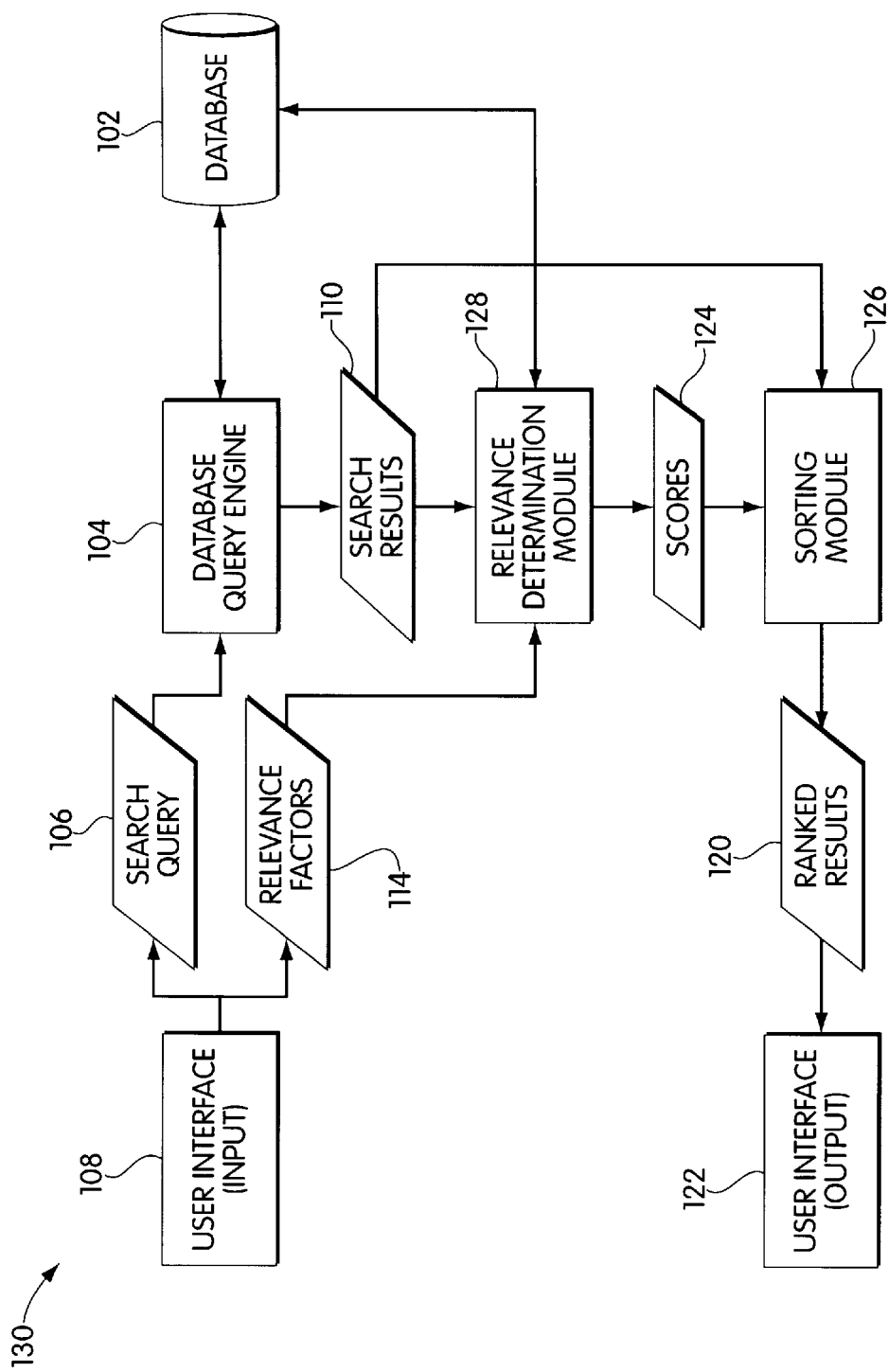
FIG. 2 is a block diagram of a second embodiment of the present invention.

Another embodiment is shown in FIG. 2. In this computer system 130, the search results 110 do not include a score with each item. Therefore, the relevance determination module 128 outputs scores 124 separately for each item in the search results. Both the search results 110 and the list of scores 124 are used by the sorting module 124 to produce ranked results for the user. The embodiment is otherwise the same as shown in FIG. 1.

The modules 108, 104, 102, 112, 118 and 122 in FIGS. 1–2 may be implemented using one or more general purpose computers which execute an application program written in a computer program language.

The computer system 100 may be one or more general purpose computer systems which are programmable using a high level computer programming language, such as "C, or "Pascal." The computer system also may be implemented using specially programmed, special purpose hardware. In a general purpose computer system, the processor is typically a commercially available processor, of which the series x86 processors, available from Intel, and the 680X0 series microprocessors available from Motorola are examples. Many other processors are available. Such a microprocessor executes a program called an operating system, of which UNIX, DOS and VMS are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written. It should be understood the invention is not limited to a particular computer platform, particular processor, or particular high-level programming language. Additionally, the computer system may be a multiprocessor computer system or may include multiple computers connected over a computer network. As such, the database may be local to the user or remote.

A suitable computer system to implement the modules of FIGS. 1 or 2 typically includes an output device which displays information to a user. The computer system includes a main unit connected to the output device and an input device, such as a keyboard. The main unit generally includes a processor connected to a memory system via an interconnection mechanism. The input device is also connected to the processor and memory system via the connection mechanism, as is the output device.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, audio input and scanner. It should be understood the invention is not limited to the particular input or output devices used in combination with the computer system or to those described herein.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form. i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

In one example embodiment, the user interface 108 may be any suitable user interface for providing the search query 106 and relevance factors 114 to the database query engine 104. Such an interface includes, but is not limited to, a client application program, commonly called a "browser," executed on a general purpose computer which communicates over a computer network with an application program executed on a server computer, called a "server," using messages containing formatted data which the server parses and provides to a database query engine. Examples of such browsers include the Navigator browser from Netscape Communications, Inc., and the Internet Explorer browser from Microsoft Corporation. These browsers present documents defining a form which can be completed by a user to include the search query 106 and relevance factors 114. An example display for a user interface in one embodiment of the invention will be described in more detail below in connection with FIG. 5. In response to the user input, the browser sends a message containing the search query and relevance factors to a designated server which processes the query. How such a user interface may be provided to allow for user input of relevance factors will be described in more detail below.

The user interface also may be a custom user interface provided by either a private on-line computer service, of which LEXIS/NEXIS online service and WestLaw online service are examples, or any other database system.

The database query engine 104 may be implemented using a computer program, to be executed on the server computer or another general purpose computer, which implements some techniques for performing database queries, of which several are known. For example, the database query engine may be a program associated with an HTTP server, such as the HTTP server available from Netscape Communications, Inc., called the Netscape Enterprise server. Such a server has an application programming interface (API) which enables other computer programs to be connected to and accessed through this server to perform various functions, including database queries. Other example database query engines include those provided through a variety of private on-line services and commercially-available database systems as described above.

The user interface for output 122 may be the same as the user interface 108, or may be another mechanism, such as a printer, electronic mail, data file, or some other source of data which may be accessed by a user.

As will be understood from the foregoing, elements 102–108 and 120 may be any of a variety of kinds of systems for performing database queries that are well known in the field. In addition, it should be understood that the various modules shown in FIGS. 1 to 2 may be implemented, combined and/or integrated in a variety of different ways. In particular, the coordination of the transfer of data between the modules may be performed in any desired manner.

Figure 3:
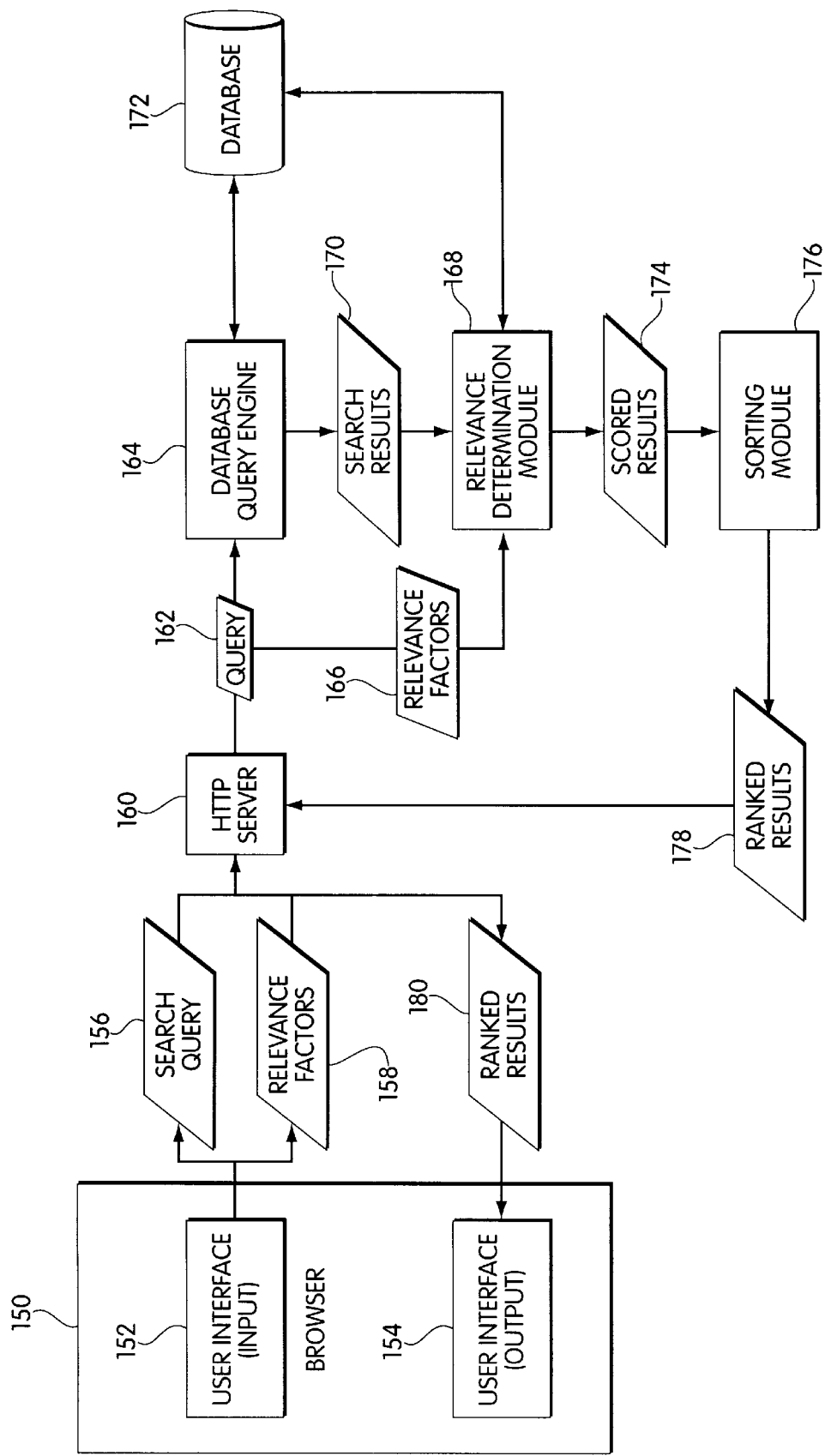
FIG. 3 is a block diagram of an embodiment of the present invention using a client computer and a server computer interconnected over a computer network.

FIG. 3 shows a particular embodiment of the invention which uses a browser such as described above which presents HTML documents to a user as shown at 150 in FIG. 3. The browser can both receive input from a user and provide output as indicated at 152 and 154, respectively. In this embodiment, the user-provided search query 156 and relevance factors 158 are sent to a server 160 such as an HTTP server, examples of which were described above. The HTTP server 160 has an interface through which a query 162, derived from the input 156 from the browser 150, can be provided to a database query engine 164. Similarly, relevance factors 166 derived from the input relevance factors 158 can be provided to a relevance determination module 168. The database query engine 164 provides search results 170 to the relevance determination module. In addition, the relevance determination module may access the database 172. This relevance determination module 168 then provides the scored results 174 which are provided through a sorting module 176. The ranked results 178 provided by the sorting module are formed into an HTML document which is returned to the browser 150 via the HTTP server 160 as indicated at 180.

Having described the general environment in which the present invention may be used and a particular embodiment thereof, the application of user-defined relevance factors 114 to search results 110 by a relevance determination module 112 will now be described in more detail.

First, the kinds of relevance factors that may be used will be described. A relevance factor is a value associated with an attribute which an item in a database may have that either other items in the database might not have to the same degree (where the attribute may have a range of values), or which other items in the database might not have at all (where the attribute is either present or not). For example, whether a document contains a particular word is an attribute of a document. A date associated with a document may be attribute. The location of a document in a directory in a file system, the size of a document, and other features may all be attributes.

A few examples of relevance factors and their associated attributes for documents will now be described in more detail. One relevance factor is the location of a search term in the document, or the field that contains the search term. For example, if a search term occurs in the title of a document, that document may be more relevant than a document in which the search term appears in a footnote. If a structured document is being used, such as a document in the standard generalized markup language (SGML) or one of several document types, such as documents in the hypertext markup language (HTML), the structural information about a document may be used to give more or less weight to a term depending upon the enclosing tags. For example, a search term which appears inside a <TITLE></TITLE> tag pair might be given a greater relevance weighting than the same word in the same document but in normal body text.

Another relevance factor is the position of search terms in the document, called the salience of the search term. This factor relates to the position of a word in a specific field of a given document. For example, a search term appearing in the first sentence of the first paragraph of a field will have greater salience to the field search than the same term found in the last sentence of the last paragraph of the same field.

Another relevance factor is the frequency of occurrence of a search term in the document. The number of times a word appears in a document relative to the number of all words in the document can indicate the relevance of a document. For example, a long document that uses the word "Clinton" a few times is probably less relevant to a search for "Bill Clinton" than a document of the same length that uses the word "Clinton" many times.

Another relevance factor is the frequency of occurrence of a search term in all documents. The number of times a word appears in the collection of documents relative to the total size of that collection affects the relevance of a term to a specific document. This is referred to as TFIDF weighting for Term Frequency Inverse Document Frequency weighting.

Another relevance factor is the number of search terms found in the document. For example, if the user enters a query that has six search terms, than documents which contain all six search terms generally are considered more relevant than documents which contain only five of the six search terms. This relevance factor is particularly useful in calculating the relevance of logical OR searches.

Another relevance factor is the ordering of search terms in the document. That is, if the query terms appear in their given order in a document, than a relevance bonus may be applied to the document. For example, if the query entered is "Bill AND Clinton," then documents which preserve this order will be considered more relevant than documents in which the word "Clinton" preceded "Bill" in the document.

Another relevance factor is the pairwise distance between search terms in a document. In other words, the closer together the search terms appear in the document, the higher the relevance bonus may be. For example, if the query is "Bill" and "Clinton." then documents which contain "Bill" and "Clinton" next to each other will rank higher than documents in which "Bill" and "Clinton" are separated by intervening words.

Another relevance factor is related to the length of search words and is based on stemming. This factor is important if word stemming is supported in the search engine. Word stemming is a way of expanding the number of search terms by applying a series of suffixes to a base search term. For example, if a search term is bill", when stemming is employed the search engine might also search for "Bills," "Billion," etc. Of these, the original search term, "Bill," will be considered more relevant than the other examples, whereas the term "Bills" will be considered to be more relevant to the search than "Billion." Other longer stemmed extensions correspondingly are less relevant.

Default values for the relevance factors used in any particular section may be stored as global variables of the database or the database query engine or the relevance determination module. The following table sets forth an example of name, data type and default values for the foregoing, relevance factors, and a description of each.

| Name | Max | Default | Description |
| --- | --- | --- | --- |
| weight_word_match | 1000 | 1000 | Base for the number which is added for each word from the query matching for a record |
| weight_tfidf | 100 | 10 | Base for the Term-Frequency Invert-Document-Frequency calculations |
| weight_field | 100 | 90 | Base for field bonuses applied with the field-configuration file |
| weight_position | 30 | 15 | Base for the word position within a field. Words closer to the front of the field receive a higher bonus. |
| weight_proximity | 100 | 10 | Base for the bonus based on two words of distance from each other. Words closer together receive a higher bonus |
| weight_order | 20 | 2 | Base for the bonus based on word order. Words in a document in the same order as the search receive a bonus |
| weight_prefix | 20 | 10 | Base for the bonus based on word prefix size for word stemming |

These default values are useful as a starting point when presenting a user with an interface for adjusting the relevance factors. For example, in the embodiment of FIG. 3, a document may be prepared for display to the user based on these variables. The user may then manipulate several parameters of the user input interface to vary the relevance factors. Each of these factors is defined as a parameter which is associated with a value. It should be understood that additional parameters easily can be added and that the invention is not limited to the parameters shown or any subset thereof. "MAXINT" is the maximum integer value supported by the relevance determination module which is $2^n-1$, where n is the number of bits used to represent an integer. The table below illustrates the parameters in one embodiment of the invention.

| PARAMETER | DESCRIPTION | POSSIBLE VALUES |
| --- | --- | --- |
| rt | enable relevance tuning | 1, yes, true |
| rtwm | word match | 0-->MAXINT |
| rttf | TFIDF | 0-->MAXINT |
| ftfd | field | 0-->MAXINT |
| rtpn | position | 0-->MAXINT |
| rtpy | proximity | 0-->MAXINT |
| rtor | order | 0-->MAXINT |
| rtpx | prefix | 0-->MAXINT |

In the embodiment shown in FIG. 3, the user may submit a query by inputting values through a form or other interface in the browser, which are converted into the form of a uniform resource locator (URL) by the database query engine. The standard form of a URL includes an indication of a protocol, a host, a filename and parameters, separated by delimiters, as follows:

protocol://host/filename?parameter1=value1&parameter2=value2.

The relevance factors would be used as parameters included in the URL separated by an ampersand (&) delimiter. As an example, to enable relevance tuning on a query and to set the "order" weight to 100, the following would be submitted:

http://host/cgi-bin/query_program?query_terms&rt=1&=100 where the query-program is the program that, when executed, is the database search engine, query-terms are the search terms.

It should be understood that any other form of message that contains the search terms and relevance factors may be used to communicate them to the database query engine and that the invention is not limited to any particular form. The user also may specify a kind of search for which the weights associated with the relevance factors are predetermined.

Figure 5:
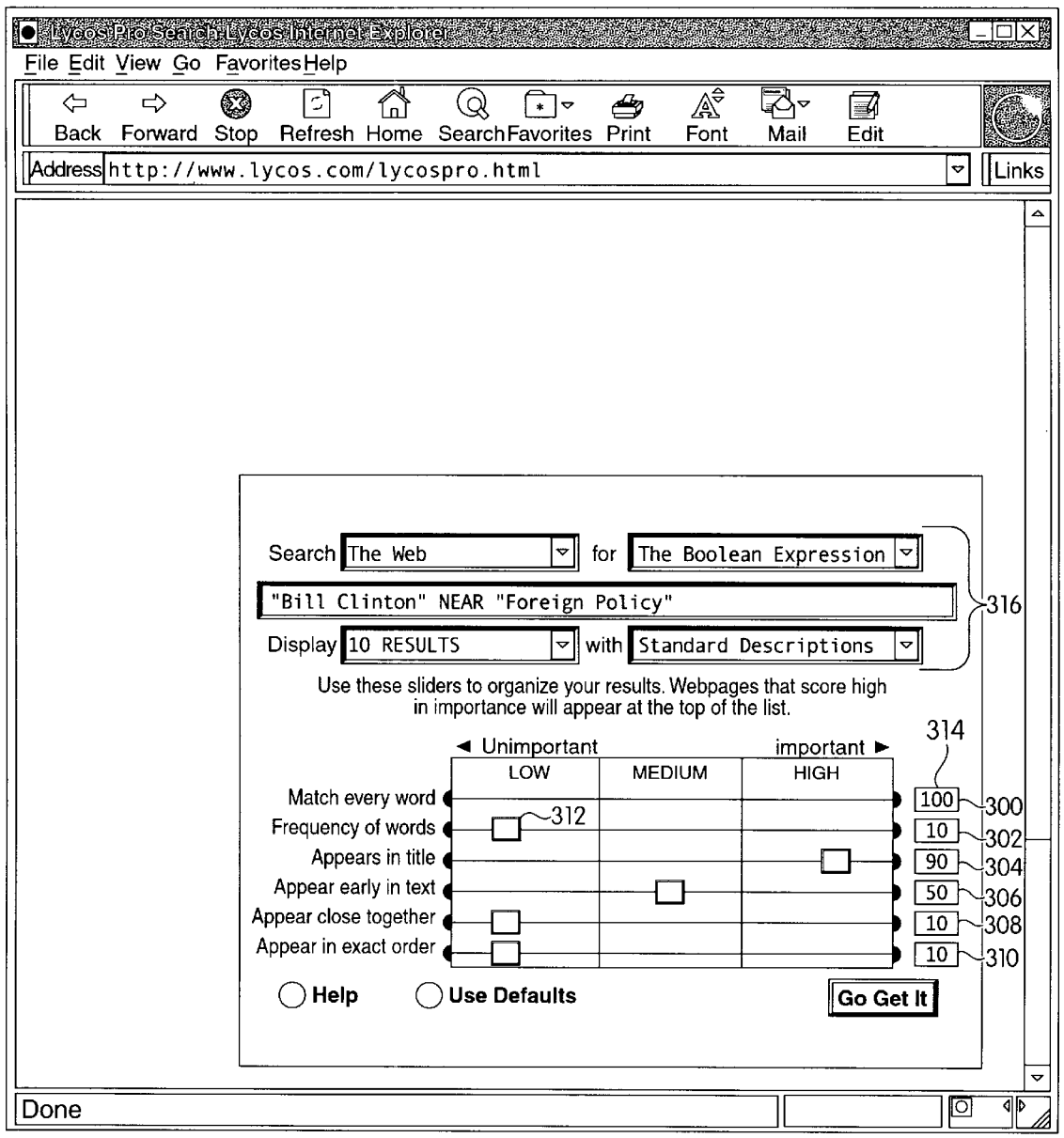
FIG. 5 illustrates a graphical user interface for a browser for permitting a user to input a search query and values for relevance factors.

FIG. 5 illustrates an example graphical user interface through which a user may input various values for the relevance factors. The relevance factors shown in this interface include the word match 300, frequency (TFIDF) 302, field 304, position 306, proximity 308 and order 310 factors. The user manipulates a button on a slider bar (e.g., button 312) to adjust the value for the factor. The corresponding value set by the user (corresponding to the slider button position, that is) is displayed at a box such as 314. A region 316 of the interface allows the user to input a search query. Such an interface may be created, for example, by appropriate programming using the Java programming language. Other interfaces may be created by using HTML forms to allow a user to type in a value or to select a value from the menu.

Figure 6:
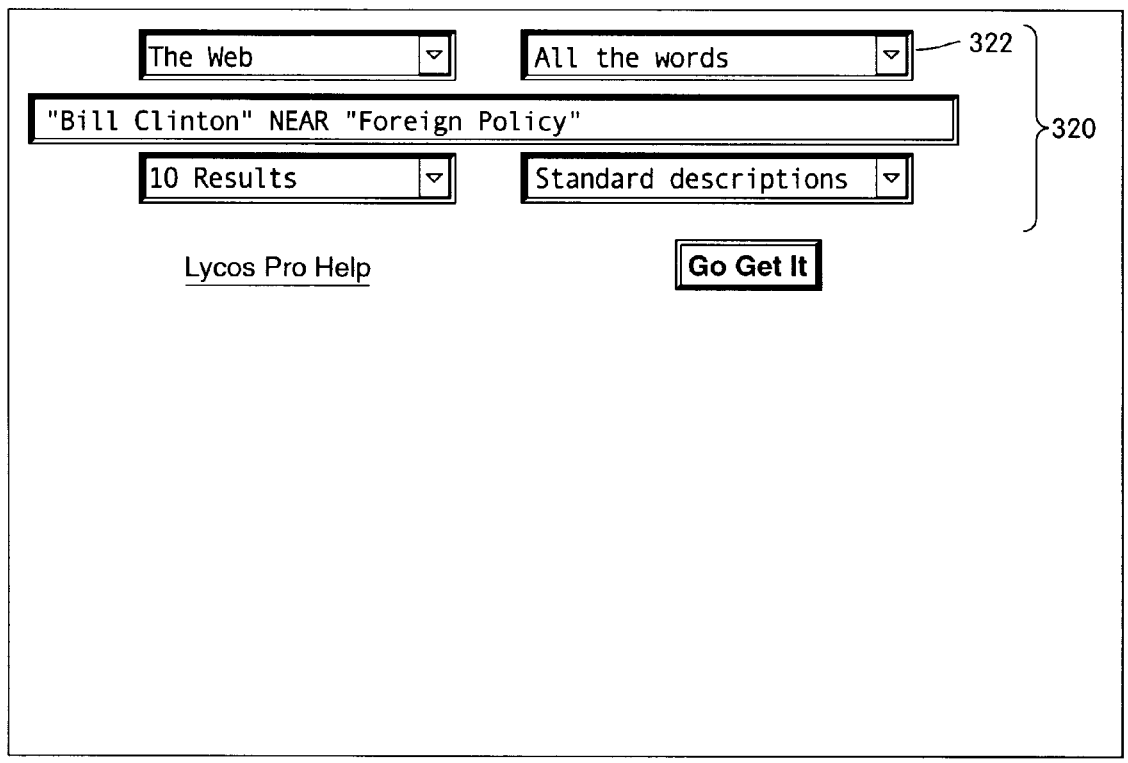
FIG. 6 illustrates another embodiment of the graphical user interface.

An example embodiment using an HTML form is shown in FIG. 6. In FIG. 6, the embodiment does not use a Java-implemented interface. The search input panel 320 is similar to panel 316 in FIG. 5, except a drop-down menu 322 allows a user to specify a kind of search, such a specifying finding all of the words or any of the words. The embodiment also may allow the user to specify finding the exact phrase, or performing natural language query or the specified boolean expression.

In the embodiment shown in FIG. 5, from the user's perspective all values for the relevance factors are in the range of zero to 100. Such an interface may be more intuitive to a user than an interface that uses the actual range of weight values because the relative importance of a factor may be displayed. For instance, if the position factor is assigned the value 100 and the proximity factor 50, then the position of words in a document is twice as important as their closeness together. The input value is then mapped to the range of values for the weights actually used by the relevance determination module described in the table above. This mapping may be either linear or non-linear.

As is commonly done with search queries in general, in the embodiment shown in FIG. 3 the search terms and other parameters in a URL are processed on the server side by parsing the URL. The search terms and relevance factors extracted from the URL are then formed into respective data structures which are used, respectively, by the database query engine and by the relevance determination module.

The actual form of the query, its representative data structure, how the query is performed and how results are returned involve common techniques known in the art. For the purposes of understanding and illustrating the present invention, a query typically returns an array, list or other data structure containing records, or other data structures, which indicate each record in the database that matches the query. Such records typically include an identifier of the database, if more than one database was searched, and an identifier of the record in the database.

An example data structure for returning a single record about a single document that meets a user's query is described below. An array of these data structures is typically returned by the query engine.

```
typedef struct {
unsigned int    error_check;   /* an error checking value
                                  to verify struct */
unsigned int    flags;         /* associated bit-flags */
crid_t          crid;          /* record identifier of this
                                  item in the catalog */
unsigned int    match_n;       /* number of words that
                                  matched */
rel_t           relevance;     /* metric from 1 (low) to
                                  MAXINT (high) */
cat_id_t        catalog_id     /* identifier of the catalog
                                  containing this item */
} result_t;
```

In this data structure, qr_error_check is an error checking value used to verify the structure.

flags: this value may be used to indicate any additional information associated with this result entry.

crid: this value is the catalog record identifier which references the database record of the document.

match_n: this value represents the number of terms that were matched in this record. This value is reflected as part of the relevance score.

relevance: this value represents the metric for relevance. A larger number indicates that the record is more relevant to the query. The value initially may be zero as returned by the query engine, or the query engine may initialize the value according to the word match relevance factor. After processing by the relevance determination module, this value is the final relevance value used by the sorting module described below.

catalog_id: this value is the numerical identifier of the catalog or database in which this match was found.

A sample output from a query engine may be the following:

{error_checking,0, 12341, 4, 0, 2},
{error_checking,0, 145, 1, 0, 1},
{error_checking,0, 10341245, 3, 0, 1},
{error_checking, RESULT_END}

Each of fields in the data structure for the relevance factors represents a weight which is used to increase or decrease the bonuses given for the corresponding attribute for each document. An example data structure for the relevance factors defined in the C programming language is the following:

```
typedef struct {
rel_t word_match;    /* for each word matching in the document */
rel_t tfidf;         /* weight for tfidf ratio */
rel_t field;         /* field bonus: title, body, etc. */
rel_t position;      /* position of word in a field */
rel_t proximity;     /* closeness of two words */
rel_t order;         /* word order */
rel_t prefix;        /* prefix distance for stemming */
} weights;
```

In this data structure, the fields have the following meanings:

word_match: This weight corresponds to whether a term in the query occurs in a document. For example, if each term in a three term query occurs in a document, regardless of the number of times the terms occurs, the document receives a partial score for this factor of three times the weight assigned to this factor. In general, this value should be much higher than the others because documents that have more of the search terms should be greatly rewarded. By default, some query functions already sort documents based solely on the number of terms matching in a document. This feature may be overridden in some systems to allow documents can be sorted on a relevance basis in the invention.

tfidf: This weight corresponds to the Term-Frequency Inverse Document-Frequency value. As discussed above, in general, TFIDF is a metric which compares the frequency of a term in a document compared to how frequent the term occurs in a corpora.

field: This weight corresponds to the field in which a search term occurs. For example, a term occurring in a title field probably should result in a relevance bonus higher than a term occurring in the document body.

position: This weight corresponds to the position of a term in a field. A term receives a bonus if it appears closer to the front of a field. Terms closer to the front of a document usually are more indicative of the subject of and therefore are more relevant to the document.

order: This weight corresponds to whether two search terms occur in order in the document. If the search query is "word-a AND word-b"' and word-a is before word-b in a document, a bonus is applied.

prefix: This weight corresponds to the number of characters difference in length of the search term and a term in a document. For example, if the search terms is "dog" and the document has "dogs", which has one extra character, the document should be more relevant to the search than a document with "dogging," which has three extra characters.

Given the relevance factors and the search results, each item which matches the query is given a score according to the relevance factors. In order to perform this scoring, the record for the item in the database is analyzed to determine whether its attributes match the criteria for the factor in order to receive the weight associated with the factor. The information needed to determine the bonus to be applied typically is readily available in an indexed database since the index is needed to perform the query in the first place. Such information also may be provided in the search results.

Figure 4:
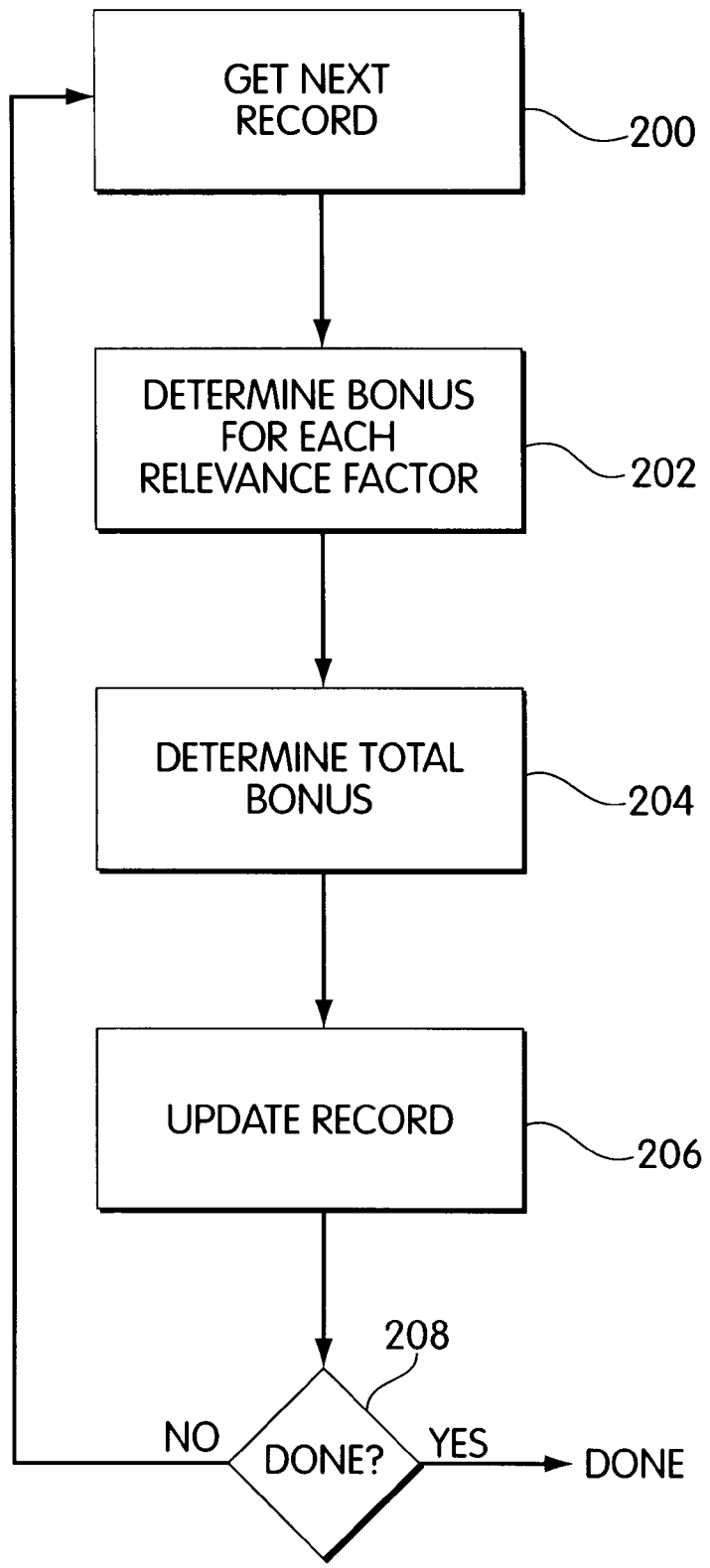
FIG. 4 is a flow chart describing how the relevance determination module determines a score for each item retrieved from a query.

One embodiment of a technique for determining the relevance score for each document will now be described in connection with FIG. 4. This embodiment assumes that a list or array of search results, identifying database records, has been received. The first step, 200, is obtaining the next record to be analyzed from the search result. The relevance value for each relevance factor is then determined in step 202. This determination will vary for each factor, as will be described below. The bonuses determined for all of the relevance factors are then summed in step 204. This sum is inserted in the search results record in step 206 where this record contains a slot for the score of each item as shown above. If all the records have been analyzed as determined in step 208, the process is completed; otherwise, the process is repeated for the next record in the search results, in step 200.

Determination of the bonus for each relevance factor, step 202, will now be described by way of example. Since there are a variety of ways to compute a bonus value for a document for each relevance factor, the invention is not limited to the following example. While this example is provided for text documents, it should be understood that the invention is not limited thereto.

Generally speaking, where the attribute of the document is either present or not, such as whether a search term occurs in the document, the bonus may be applied to the document simply according to the presence or absence of this attribute. For example, for every word in the search query which occurs in the document, the weight corresponding to this relevance factor is multiplied by the number of matched terms to produce the bonus. On the other hand, where the attribute corresponding to the relevance factor is a range of values, there are several approaches for determining the ultimate bonus. For example, the attribute may be converted into a fraction which is multiplied by the weight corresponding to the relevance factor to obtain the bonus.

A specific formula for determining the bonus for a document corresponding to the relevance factors illustrated in FIG. 5 will now be described. For the frequency or TFIDF, field and position factors, the computation is performed for each term in the search query. For the proximity and order factors, the computation is performed for each pair of terms in the query.

In order to compute the bonus corresponding to the TFIDF factor0, the ratio of the number of instances of a search term in a document to the total number of instances of all terms in a document is computed. Then, the total number of instances of all terms in the catalog or database is computed and its ratio to the total number of instances of the search term in the catalog or database is computed. The product of these two ratios is then determined. This product is then multiplied by the TFIDF weight. The natural logarithm of this product provides the bonus applied to the document for this search term for this relevance factor. This computation is performed for each term in the search query.

The field and position bonuses are determined together for every word in the query. For a given word, the most relevant field is identified first. This most relevant field can be determined by ranking, in order of importance, the kinds of fields in the various documents in the database. Each document in the search results is searched to determine the most important field in which the search term appears. In one of the embodiments, the title is the most important field. If a search term appears in the title, the document is given a certain bonus. The occurrence of the term in other less important fields is given an increasingly lower bonus. The result of this computation is a value the type of the identified field, multiplied by the weight corresponding to this relevance factor. This product is added to the total score for the item. A position value also is computed for the instance of the search term in the identified most relevant field. This position value may be either the absolute position in the document of this instance of this search term, or the position value may be the position of this instance of this search term in the identified field. Another bonus for the document is then determined by subtracting this minimum position value from the total number of instances of all words in the document or the identified field, plus one. The resulting difference is divided by the total number of instances of all words in the document or the identified field. That quotient is multiplied by the weight corresponding to this relevance factor. The resulting value is added to the score for the document.

The proximity and order bonuses may be determined together for any given pair of words in a query. Given a pair of words, a list of all of the instances of that word pair in the document is obtained; typically this data which can be obtained readily from the index. This list of instances should include an indication of the position of the instance of the word in the document. A distance is computed between every instance of one word and every instance of the other word in its pairing. The minimum distance is retained. If this distance is below a predetermined maximum distance, then a bonus is given to the document. This bonus is computed by determining the difference between the maximum value and the computed distance, less one. This difference is divided by the maximum value. The resulting quotient is multiplied by the weight for this relevance factor. If the two corresponding instances of the two words occur in order as they appear in the search query, the weight for the order relevance factor also is added to the score for this document.

It should be understood that there are many other ways to apply relevance factors to search results, and that there are many other relevance factors that may be used. Accordingly, the invention is not limited to a particular set of relevance factors or to a specific method or methods for applying them.

After processing by the relevance determination module as described above, the array of search results may appear as follows, where the last entry has a value "RESULT-END" that indicates the end of the array.

{error_checking, 0, 12341, 4, 12006, 2},
{error_checking, 0, 10341245, 1, 673, 1},
{error_checking, 0, 145, 9013, 3, 1},
{error_checking, RESULT_END}

Having now described how the results are given a relevance score, there are many ways in which the score may be combined with the search results to provide meaningful, ranked results to the user. The sorting module generally processes the array of scored search results to sort the array, using known techniques, and to generate an output to be provided to a user that includes an indication of the documents that matched the search query, again using known techniques. Such a document may include an indication of the database record and its associated document, and possibly its score, and preferably provides a way to access the document.

An example result is shown in FIG. 7. In this embodiment, the scores are shown for each item, but in other embodiments, such scores may be omitted. This search is the result of the query shown at 320 in FIG. 6. Each item includes a hypertext link 330 to the source of the document, a descriptor 332 of the document (usually text taken from the beginning of the document), an indication 334 of the source of the document and an indication of its score, as a function of the maximum score of the retrieved items. FIG. 8 illustrates results achieved with the same query when the relevance factor is the order of the search terms, set at a value of 100. FIG. 9 illustrates the results achieved with the same query when the selected relevance factors are words match, proximity and field, with values set at 100, 100 ad 10, respectively. As can be seen from the results, the search query and number of hits remains unchanged, but the presentation of results differs.

By implementing a search engine in this manner, the user can control the ranking and presentation of documents that result from the search, based on the user's understanding of the factors that may affect the relevance of the documents to the query. In addition, the user can modify these factors without modifying the query.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer system for providing user-controllable relevance ranking of search results from a query on a collection of items of information, comprising:

a relevance determination module having a first input for receiving a set of search results of a current search from a query indicating items in the collection matching the query, a second input for receiving relevance factors input by a user through a graphical user interface, and a third input for receiving information about the items in the set of search results of the current search to which relevance factors are applied to determine a score for each of the items, and an output for providing an indication of the score indicative of relevance for each of the items in the set of search results; and a sorting module which receives the score associated with each item and an indication of the set of search results, and an output providing the user an indication of the items in the set of search results in an order ranked according to the relevance score of each item.

2. The computer system according to claim 1, wherein the query includes a search term and the relevance factors include at least one of a group of relevance factors including:

(a) location of the search term in an item in the collection of items;

(b) location of the search term in a field of the item;

(c) position of the search term in the item;

(d) frequency of occurrence of the search term in the item;

(e) frequency of occurrence of the search term in all items of the collection of items;

(f) length of a term of an item that is a stem of the search term;

(g) location of the item within a directory of files; and (h) recency of the item.

3. The computer system according to claim 1, wherein the query includes at least two search terms and the relevance factors include at least one of a group of relevance factors including:

(a) number of search terms found in a item;

(b) ordering of search terms in the item; and (c) pairwise distance between the search terms in the item.

4. The computer system according to claim 2, comprising a graphical user interface for collecting relevance factor information from a user to produce the indication, wherein the graphical user interface includes a sliding scale corresponding to each relevance factor that is adjusted by the user to assign a weight to the corresponding relevance factor.

5. The computer system according to claim 1, wherein the relevance determination module does not alter the query performed on the collection of information.

6. The computer system according to claim 1, wherein each relevance factor is assigned a base value that is specified by the user, wherein the base value corresponds to a weight of the corresponding relevance factor.

7. A computer-implemented method for providing user-controllable relevance ranking of search results of a current search from a query on a collection of items of information, comprising steps of:

receiving relevance factors input by a user through a graphical user interface;

receiving one or more search terms from a user;

performing the query using the one or more search terms and producing a set of search results of the current search;

indicating, in the search results, items in the collection matching the query;

receiving information about the items in the set of search results of the current search to which the relevance factors are applied to determine a score for each of the items;

providing an indication of the score indicative of relevance for each of the items in the set of search results; and providing to the user an indication of the items in the set of search results in an order ranked according to the relevance score of each item.

8. The computer-implemented method according to claim 7, wherein the step of providing an indication of score includes a step of totaling individual scores of relevance factors.

9. The computer-implemented method according to claim 8, comprising a step of totaling scores of relevance factors including at least one of a group of relevance factors including:

(a) location of the search term in an item in the collection of items;

(b) location of the search term in a field of the item;

(c) position of the search term in the item;

(d) frequency of occurrence of the search term in the item;

(e) frequency of occurrence of the search term in all items of the collection of items;

(f) length of a term of an item that is a stem of the search term;

(g) location of the item within a directory of files; and (h) recency of the item.

10. The computer-implemented method according to claim 8, comprising a step of totaling individual scores of relevance factors including at least one of a group of relevance factors including:

(a) number of search terms found in a item;

(b) ordering of search terms in the item; and (c) pairwise distance between the search terms in the item.

11. The computer-implemented method according to claim 7, comprising a step of collecting relevance factor information from a user to produce the indication of the score, wherein the graphical user interface includes a sliding scale corresponding to each relevance factor that is adjusted by the user to assign a weight to the corresponding relevance factor.

12. The computer system according to claim 7, including a step of assigning a base value, specified by the user, to each relevance factor, wherein the base value corresponds to a weight of the corresponding relevance factor.

* * * * *